Patented Dec. 21, 1937

2,103,216

UNITED STATES PATENT OFFICE 2,103,216

CALCIUM SULPHATE PLASTERS

John Stanley Dunn, Norton-on-Tees, and Victor Lefebure, London, England, assignors to Imperial Chemical Industries Limited, a corporation of Great Britain No Drawing. Application January 23, 1936, Serial No. 60,542. In Great Britain January 28, 1935

8 Claims. (Cl. 106—34)

This invention relates to the manufacture of calcium sulphate plasters suitable for applying to walls or floors and the object of the invention is to obtain a plaster which when trowelled and allowed to set will produce a uniformly coloured surface.

When a coloured plaster is trowelled to produce the final smooth surface, it is difficult to produce a uniformly coloured surface owing to variations in the distribution of the coloured material due to uneven pressure on the trowel and to the tendency of the finer particles to rise to the surface of the wet plaster and cause laitance (pulpy exudation). The same difficulty arises when no special addition of colouring material is made but it is desired to take advantage of the natural colour of the plaster.

We have now found that these difficulties can be largely overcome by incorporating in the plaster a proportion of already set plaster in subdivided form. The degree of subdivision of the set plaster must not be so great as that of the unset plaster, and may suitably range from $300\mu$ to $1200\mu$, i. e. from approximately one-eightieth of an inch to approximately one twentieth of an inch. Preferably both plasters are of the accelerated anhydrite type, i. e. plaster the setting properties of which are due essentially to the hydration of anhydrous calcium sulphate under the influence of small proportions of accelerators such as certain metal sulphates, e. g. potassium sulphate, zinc sulphate and aluminium sulphate. Any suitable pigment may be added to the unset plaster constituent, the same or a corresponding pigment being present in the initial plaster from which the set plaster constituent is prepared. Mineral colours are generally preferred on account of their permanence, but organic colouring materials may be used in some cases.

Example 1

A plaster consisting of natural mineral anhydrite, with small percentages of zinc and potassium sulphates as accelerators and containing green chromium oxide as pigment, was gauged with 20–40 per cent. by weight of water and allowed to set. After 24 hours the mass had hardened sufficiently to be ground. The mass was ground to a particle size of 600–1200$\mu$ and up to 60 parts of the granular material so obtained, e. g. 40 parts, were mixed with 100 parts of the original dry plaster, which was of such a grading that only 20 per cent. exceeded 300$\mu$.

The mixture was gauged with the requisite amount of water to make the mass suitable for trowelling. The plaster obtained in this manner worked more easily than ordinary wall plaster and the final set was more uniform in colour and freer from blemishes such as trowel markings, laitance, and efflorescence than the usual plasters.

The following example illustrates the use of Keene's cement, which is a plaster made by calcining gypsum at red heat, immersing the resulting product in a solution of alum and after drying, again burning it at a high temperature.

Example 2

100 parts by weight of Keene's cement containing a pigment were granulated by spraying with 24 parts of water whilst stirring in an incorporator. The resulting granular material was sieved on a sieve the meshes of which measured one-twentieth of an inch, the material retained on the sieve being crushed and re-sieved. 40 parts of the material passing through the sieve were mixed with 100 parts of the original unset cement, and the mixture was gauged with water as in Example 1.

For the purpose of the present specification the term "plaster constituent" means any form of calcium sulphate which is capable, when gauged with water, of setting to a more or less hard mass. "Unset plaster constituent" means the plaster constituent before it has been acted upon by water, and "set plaster constituent" means the plaster constituent after it has been acted upon by water. It is understood that the said constituents when referred to as such are in the dry or apparently dry state and are in a convenient state of subdivision to enable them to be gauged with water and worked with a trowel.

Various modifications of the plaster mixes and procedure previously described may be made in carrying out our invention, and all such modifications are intended to fall within the scope of the appended claims insofar as they achieve to a useful degree the new results hereinbefore described.

We claim:—

1. A plaster mix capable, when gauged with water, of setting with a uniformly coloured surface and substantially without laitance, comprising a coloured unset plaster constituent and a proportion of an already set plaster constituent containing colour incorporated prior to setting, the said set plaster constituent being less finely divided than the unset plaster constituent, both the unset plaster constituent and the set plaster constituent containing the same pigment.

2. A plaster mix as set forth in claim 1, in which the set plaster constituent is prepared from said unset plaster constituent.

3. A plaster mix as set forth in claim 1, in which the degree of subdivision of the set plaster constituent is within the range 300–1200$\mu$.

4. A plaster mix as claimed in claim 1, in which at least one of the unset and set plaster constituents is of the accelerated anhydrite type.

5. A plaster mix capable, when gauged with water, of setting with a uniformly coloured surface and substantially without laitance, comprising an unset plaster constituent consisting essentially of natural mineral anhydrite containing small percentages of zinc and potassium sulphates as accelerators together with a pigment, and up to 60 per cent. (reckoned on the weight of the unset plaster constituent) of granulated set plaster constituent of substantially the same composition as the unset plaster constituent except for combined water and containing a pigment incorporated prior to setting.

6. A plaster mix as set forth in claim 5, in which the percentage of set plaster constituent is about 40.

7. A plaster mix capable, when gauged with water, of setting with a uniformly coloured surface and substantially without laitance, comprising an unset plaster constituent consisting essentially of Keene's cement containing a pigment and up to 60 per cent. (reckoned on the weight of the unset plaster constituent) of granulated set plaster constituent of substantially the same composition as the unset plaster constituent except for combined water and containing a pigment incorporated prior to setting.

8. The process of preparing a plaster mix capable, when gauged with water, of setting with a uniformly coloured surface and substantially without laitance, comprising uniformly colouring dry powdered plaster, mixing a portion of said coloured powdered plaster with water and allowing it to set, granulating said set plaster, and mixing said granulated set plaster with the powdered unset plaster.

JOHN S. DUNN.
VICTOR LEFEBURE.